United States Patent
Wang

(10) Patent No.: US 12,099,718 B2
(45) Date of Patent: Sep. 24, 2024

(54) DEVICE CONTROL METHOD AND APPARATUS, STORAGE MEDIUM, AND ELECTRONIC DEVICE

(71) Applicant: GUANGDONG OPPO MOBILE TELECOMMUNICATIONS CORP., LTD., Dongguan (CN)

(72) Inventor: Xijun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/233,110

(22) Filed: Aug. 11, 2023

(65) Prior Publication Data

US 2023/0384929 A1 Nov. 30, 2023

Related U.S. Application Data

(63) Continuation of application No. PCT/CN2022/071796, filed on Jan. 13, 2022.

(30) Foreign Application Priority Data

Feb. 20, 2021 (CN) .................. 202110195816.4

(51) Int. Cl.
*G06F 3/04886* (2022.01)
*G06F 1/16* (2006.01)
(Continued)

(52) U.S. Cl.
CPC ........ *G06F 3/04886* (2013.01); *G06F 1/1624* (2013.01); *G06F 3/0482* (2013.01); *G06F 3/04842* (2013.01); *H04M 1/0237* (2013.01)

(58) Field of Classification Search
CPC ............... G06F 3/04166; G06F 3/0466; G06F 3/0418
(Continued)

(56) References Cited

U.S. PATENT DOCUMENTS

2016/0224305 A1* 8/2016 Lee .................. G06F 3/017
2018/0120891 A1* 5/2018 Eim .................... H04M 1/0235
(Continued)

FOREIGN PATENT DOCUMENTS

CN 107547799 A 1/2018
CN 107957836 A 4/2018
(Continued)

OTHER PUBLICATIONS

International Search Report and Written Opinion dated Apr. 13, 2022 in International Application No. PCT/CN2022/071796. English translation attached.
(Continued)

*Primary Examiner* — Mark Edwards
(74) *Attorney, Agent, or Firm* — Sheppard, Mullin, Richter & Hampton LLP

(57) ABSTRACT

Provided is a device control method, which is applied in an electronic device. The electronic device includes a retractable display screen. The method includes: determining a second display content to be displayed in addition to a first display content currently displayed; controlling, based on the second display content, the retractable display screen to stretch, for adding a display region beyond a current display region used for displaying the first display content; and displaying the second display content in the added display region, and continuing displaying the first display content in the current display region.

20 Claims, 8 Drawing Sheets

(51) Int. Cl.
*G06F 3/0482* (2013.01)
*G06F 3/04842* (2022.01)
*H04M 1/02* (2006.01)

(58) Field of Classification Search
USPC .......................................................... 345/174
See application file for complete search history.

(56) References Cited

U.S. PATENT DOCUMENTS

| | | | |
|---|---|---|---|
| 2019/0261519 A1 | 8/2019 | Park et al. | |
| 2020/0380901 A1 | 12/2020 | Ryu et al. | |
| 2021/0201722 A1* | 7/2021 | Jeong | G09G 3/035 |
| 2022/0329687 A1* | 10/2022 | Kim | G06F 1/1624 |

FOREIGN PATENT DOCUMENTS

| | | |
|---|---|---|
| CN | 109710206 A | 5/2019 |
| CN | 110191226 A | 8/2019 |
| CN | 111090408 A | 5/2020 |
| CN | 111104086 A | 5/2020 |
| CN | 111459333 A | 7/2020 |
| CN | 111459374 A | 7/2020 |
| CN | 111727423 A | 9/2020 |
| EP | 3531230 A2 | 8/2019 |
| EP | 3531230 A3 | 1/2020 |
| EP | 4027626 A1 | 7/2022 |

OTHER PUBLICATIONS

The First Office Action from corresponding Chinese Application No. 202110195816.4 dated Apr. 22, 2024. English translation attached.

The Second Office Action from corresponding Chinese Application No. 202110195816.4, dated Jun. 30, 2024. English translation attached.

Extended European Search Report dated Jun. 28, 2024 received in European Patent Application No. EP22755475.5.

* cited by examiner

DEVICE CONTROL METHOD AND APPARATUS, STORAGE MEDIUM, AND ELECTRONIC DEVICE

This application a continuation of International Application No. PCT/CN2022/071796 filed on Jan. 13, 2022, which claims a priority to Chinese Patent Application No. 202110195816.4, entitled "DEVICE CONTROL METHOD AND APPARATUS, STORAGE MEDIUM, AND ELECTRONIC DEVICE", and filed with China National Intellectual Property Administration on Feb. 20, 2021, the entire contents of which are incorporated herein by reference.

FIELD

The present disclosure relates to the field of terminal technologies, and more particularly, to a device control method and apparatus, a storage medium, and an electronic device.

BACKGROUND

With the continuous development of terminal technology, if there are other contents to be displayed by an electronic device in addition to a content currently displayed by the electronic device, the other contents are usually displayed in the related art by superimposing the other contents on the content currently displayed.

SUMMARY

Embodiments of the present disclosure provide a device control method, a storage medium, and an electronic device.

In a first aspect, the embodiments of the present disclosure provide a device control method. The device control method includes: determining a second display content to be displayed in addition to a first display content that is currently displayed; controlling, based on the second display content, the retractable display screen to stretch, for adding a display region beyond a current display region in which the first display content is displayed; and displaying the second display content in the added display region, and continuing displaying the first display content in the current display region.

In a second aspect, the embodiments of the present disclosure further provide a storage medium. The storage medium stores a computer program. The computer program, when executed on a computer, causes the computer to perform the device control method according to any of the embodiments of the present disclosure.

In a third aspect, the embodiments of the present disclosure further provide an electronic device. The electronic device includes a processor and a memory. The memory stores a computer program. The processor is configured to invoke the computer program to perform the device control method according to any of the embodiments of the present disclosure.

BRIEF DESCRIPTION OF THE DRAWINGS

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DETAILED DESCRIPTION

Technical solutions according to embodiments of the present disclosure will be described clearly and completely below in combination with accompanying drawings of the embodiments of the present disclosure. Obviously, the embodiments described below are only a part of the embodiments of the present disclosure, rather than all embodiments of the present disclosure. On a basis of the embodiments of the present disclosure, all other embodiments obtained by those skilled in the art without creative labor shall fall within the protection scope of the present disclosure.

References herein to "embodiments" mean that a particular feature, structure, or characteristic described in connection with the embodiments may be included in at least one embodiment of the present disclosure. The term appearing at various places of the specification does not necessarily refer to the same embodiment, nor is it a separate or alternative embodiment that is mutually exclusive with other embodiments. It should be understood, both explicitly and implicitly, by those skilled in the art that the embodiments described herein may be combined with other embodiments.

The embodiments of the present disclosure provide a device control method. The device control method may be executed by a device control apparatus according to the embodiments of the present disclosure, or an electronic device integrated with the device control apparatus. The device control apparatus can be implemented in hardware or software. The electronic device may be a smartphone, a tablet computer, a handheld computer, a laptop computer, a desktop computer, or the like.

Figure 1:
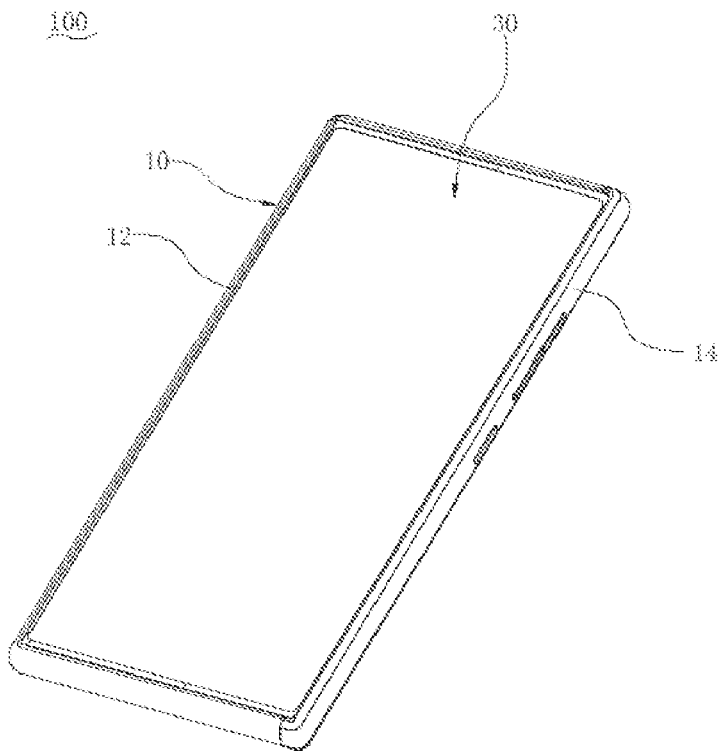
FIG. 1 to FIG. 5 are each a schematic structural diagram of an electronic device having a retractable display screen according to an embodiment of the present disclosure.
Figure 2:
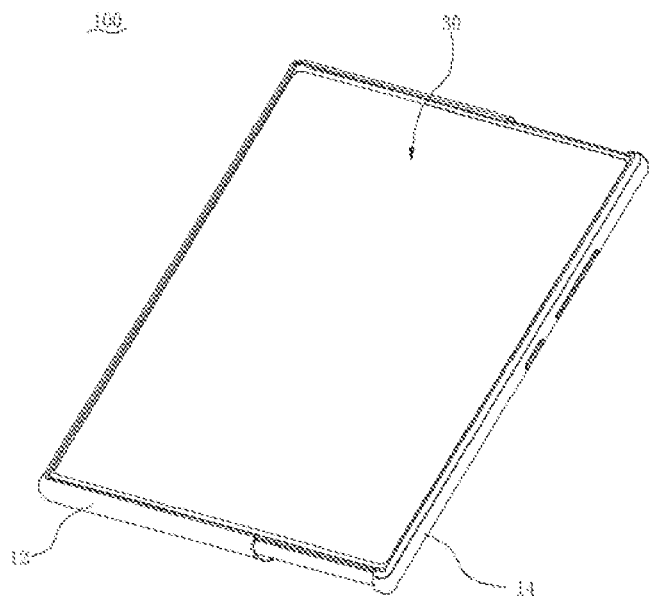
Figure 3:
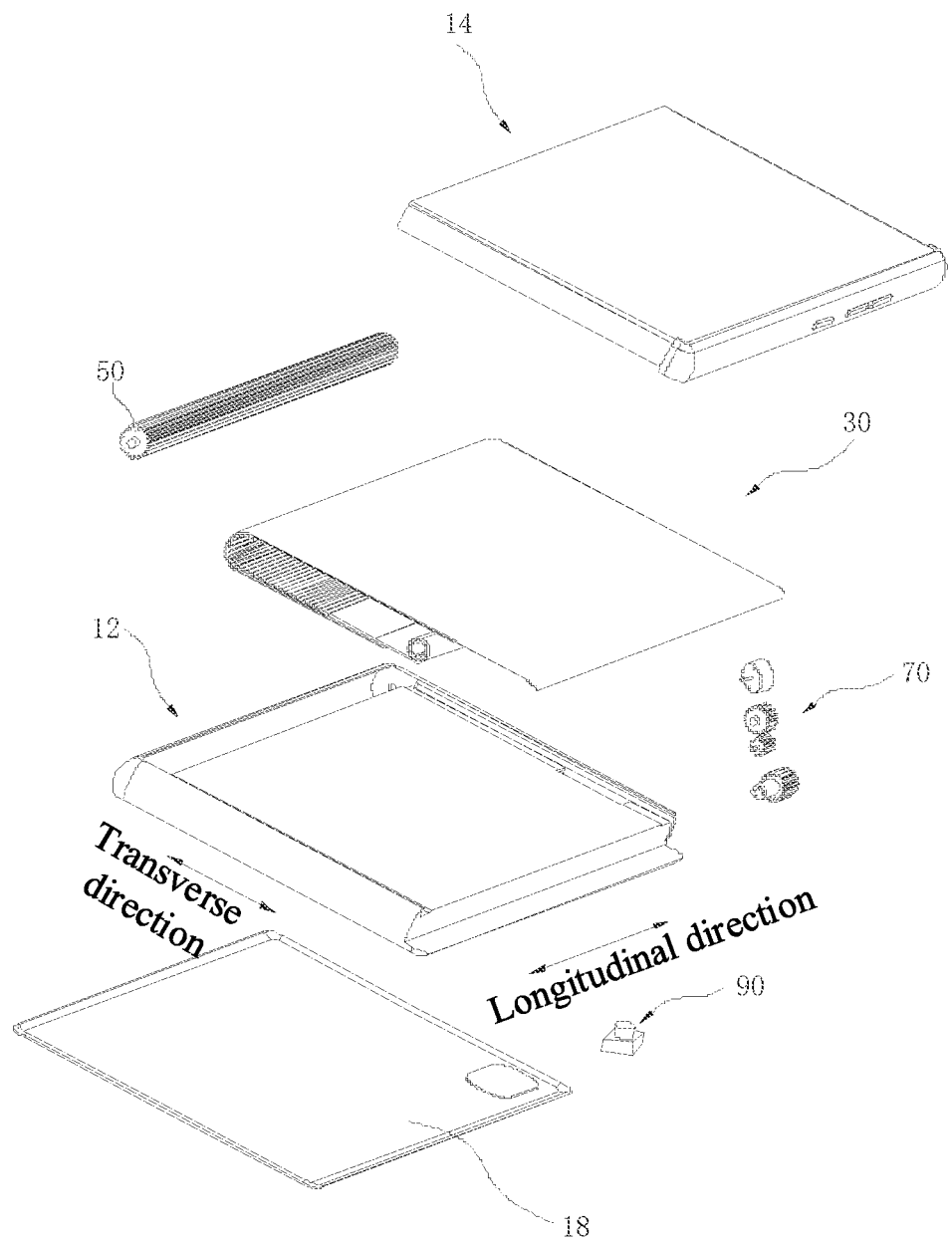

FIG. 1 to FIG. 3 are each a schematic structural diagram of an electronic device having a retractable touch display screen according to an embodiment of the present disclosure.

An electronic device 100 of an embodiment includes a housing assembly 10, a flexible display screen 30, a moving member 50, and a drive mechanism 70. The housing assembly 10 has a hollow structure. Members such as the moving member 50, the drive mechanism 70, and a camera 90 may all be disposed in the housing assembly 10. It should be understood that the electronic device 100 of the embodiment of the present disclosure includes, but is not limited to, a mobile terminal such as a cell phone and a tablet computer or other portable electronic devices. As an example, the present disclosure describes the electronic device 100 as a cell phone.

In the embodiment, the housing assembly 10 includes a first housing 12 and a second housing 14 that are movable relative to each other. In the embodiment, the first housing 12 and the second housing 14 are slidably connected. That is, the second housing 14 is slidable relative to the first housing 12.

Figure 4:
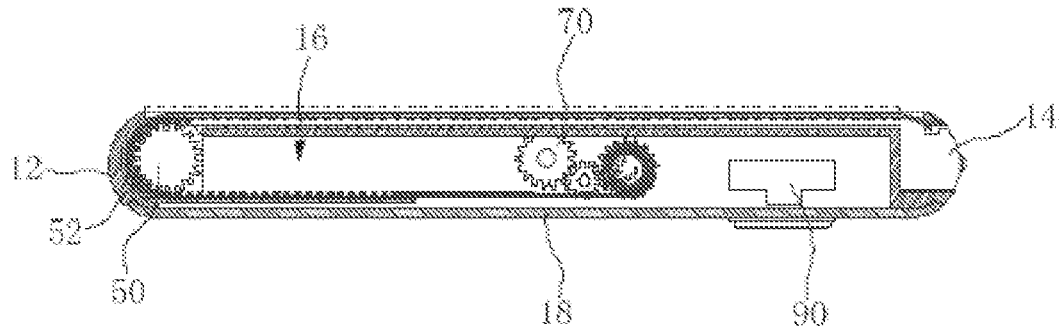
Figure 5:
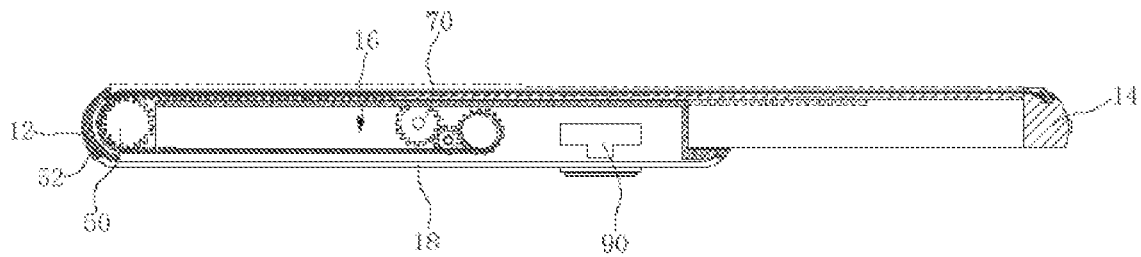

As illustrated in FIG. 4 and FIG. 5, an accommodation space 16 is defined by the first housing 12 and the second housing 14 together. The accommodation space 16 may be configured to receive members such as the moving member 50, the camera 90, and the drive mechanism 70. The housing assembly 10 may further include a rear cover 18. The accommodation space 16 is defined by the rear cover 18, the first housing 12, and the second housing 14 together.

The moving member 50 is disposed on the second housing 14. One end of the flexible display screen 30 is disposed on the first housing 12. The flexible display screen 30 bypasses the moving member 50. The other end of the flexible display screen is disposed in the accommodation space 16, in such a manner that a part of the flexible display screen is hidden in the accommodation space 16. The part of the flexible display screen 30 hidden in the accommodation space 16 may not be lit. The first housing 12 and the second housing 14 are relatively far away from each other. The flexible display screen 30 can be driven by the moving member 50 to stretch, to expose more of the flexible display screen 30 outside the accommodation space 16, as illustrated in FIG. 5. The flexible display screen 30 exposed outside the accommodation space 16 is lit to enlarge a display region presented by the electronic device 100. For example, FIG. 1 and FIG. 2 may illustrate, for comparison, a change in morphology of the flexible display screen 30 of the electronic device from a retracted state to a transversely stretched state.

The moving member 50 may be a pivot structure having a tooth 52 disposed on an outside thereof. The flexible display screen 30 is moved along with the moving member 50 by engagement, etc. When the first housing 12 and the second housing 14 are moved relatively away from each other, the flexible display screen 30 engaged on the moving member 50 is driven by the moving member 50 to partially move and stretch.

It should be understood that the moving member 50 may also be a circular shaft with no tooth 52 attached. When the first housing 12 and the second housing 14 are moved relatively away from each other, the flexible display screen 30 wound on the moving member 50 is partially spread by the moving member 50, to expose more of the flexible display screen outside the accommodation space 16 in a flat state. In some embodiments, the moving member 50 is rotatably disposed on the second housing 14. When the flexible display screen 30 is gradually spread, the moving member 50 may rotate with a movement of the flexible display screen 30.

In other embodiments, the moving member 50 may also be fixed to the second housing 14 and has a smooth surface. When the flexible display screen 30 is spread, the moving member 50 is in slidable contact with the flexible display screen 30 by its smooth surface.

When the first housing 12 and the second housing 14 are moved relatively towards each other, the flexible display screen may be driven by the moving member 50 to retract. Or, the electronic device 100 further includes a reset member (not illustrated). The other end of the flexible display screen accommodated in the accommodation space 16 is moved along with the reset member. When the first housing 12 and the second housing 14 are moved relatively towards each other, the reset member drives the flexible display screen 30 to reset, thereby allowing the flexible display screen to be partially retracted in the accommodation space 16.

In the embodiment, the drive mechanism 70 may be disposed in the accommodation space 16. The drive mechanism 70 may be moved along with the second housing 14. The drive mechanism 70 is configured to drive the second housing 14 to move away from the first housing 12, to drive the flexible display assembly 30 to stretch. It should be understood that the drive mechanism 70 may also be omitted. A user may directly make the first housing and the second housing move relative to each other manually or by other means.

It should be noted that, in addition to making the flexible display screen stretchable/retractable in a transverse direction of the electronic device in accordance with a hardware arrangement design illustrated in FIG. 1 to FIG. 5, in some other embodiments, a direction of the hardware arrangement design may be changed to allow the flexible display screen to be stretchable/retractable in a longitudinal direction of the electronic device (for example, in an up-down direction).

It should be understood that the embodiments of the present disclosure may be executed by an electronic device such as a smartphone or a tablet computer.

Figure 6:
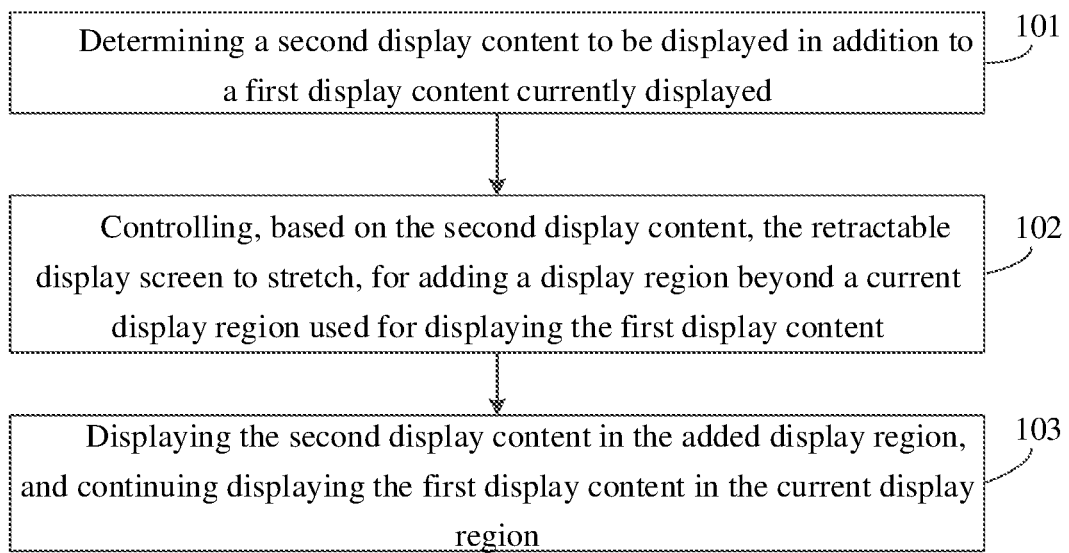
FIG. 6 is a first flowchart illustrating a device control method according to an embodiment of the present disclosure.

FIG. 6 is a first flowchart illustrating a device control method according to an embodiment of the present disclosure. The device control method may be applied in an electronic device that may include a retractable display screen. As illustrated in FIG. 6, a process of the device control method may include the following operations.

At 101, a second display content to be displayed in addition to a first display content currently displayed is determined.

The first display content currently displayed refers to a content displayed on a current page of the electronic device. The second display content refers to a content that the user wants to display on a screen of the electronic device, a message pushed by a system, etc. The content that the user wants to display on the screen of the electronic device may be, e.g., a bullet-screen comment of a video, a video comment, lyrics, and a keyboard. The message pushed by the system may be a message pushed by various applications, such as news pushed by a news application, a new message reminder pushed by a social application, and an application update reminder, etc.

It should be noted that in the embodiments of the present disclosure, the electronic device may have a retractable display screen. The retractable display screen may be a display screen that can be retracted or stretched (also known as a retractable display panel). The retractable display screen may be a flexible display screen that can be bent, curled, folded, etc. In an electronic device configured with the retractable display screen, a visible size of the screen can be increased by stretching the retractable display screen, and the visible size of the screen can be reduced by retracting the retractable display screen. For example, the flexible display screen 30 in each of FIG. 1 to FIG. 5 is the retractable display screen.

At 102, the retractable display screen is controlled, based on the second display content, to stretch, for adding a display region beyond a current display region used for displaying the first display content.

For example, when the second display content requires a small display region, the retractable display screen is controlled to be increased by the small display region accordingly; and when the second display content requires a large display region, the retractable display screen is controlled to be increased by the large display region accordingly.

It should be understood that in the embodiments of the present disclosure, the electronic device can automatically control, based on the second display content, the retractable display screen to stretch, to realize an addition of a display region of a size adapted to the second display content.

At 103, the second display content is displayed in the added display region, and the first display content continues to be displayed in the current display region.

If the electronic device displays other contents in addition to a currently displayed content by superimposing the other contents on the currently displayed content, a displayed content will be partially blocked in this case, leading to a poor display effect. For example, when the user watches a video, bullet-screen comments appear at the top of the video to enhance interaction, but the bullet-screen comments tend to block a content of the video, affecting the user's viewing of the content of the video. For example, when the message pushed by the system occurs, generally a floating window pops up in a current interface in the related art to display such a notification message, to push the notification message to the user timely. However, the floating window, when popping up, blocks the currently displayed content of the electronic device. For example, when the user is playing a game, the currently displayed content of the electronic device is a game picture. When an application pushes its notification message, the floating window will block the game picture. If the notification message happens to block a control button of the game or cover important information in the game, great impact will be inevitably exerted on the user.

Therefore, the embodiments of the present disclosure proposes that, when there is the content or the message pushed by the system that the user wants to display on the screen of the electronic device, if a display region that can be added after the current electronic device is stretched meets a display region needed for displaying the second display content, the display region is added beyond the current display region used for displaying the first display content. The added display region is configured to display the second display content. The electronic device keeps displaying the first display content in the current display region. In this way, no first display content will be blocked by the second display content, which improves a display effect of the electronic device.

Figure 7:
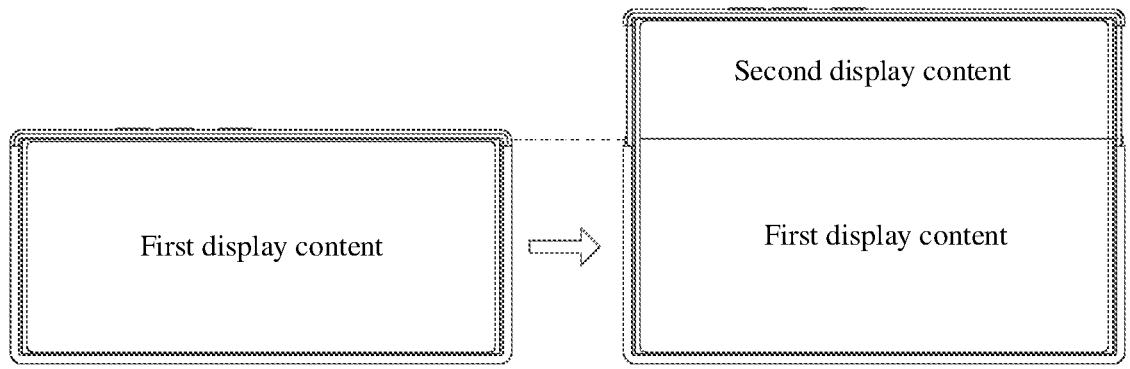
FIG. 7 is a schematic diagram illustrating a scenario of a device control method according to an embodiment of the present disclosure.

FIG. 7 is a schematic diagram of a scenario in which a retractable display screen of the electronic device is stretched to add the display region to display the second display content. The schematic diagram of FIG. 7 illustrates stretching of the retractable display screen of the electronic device from a small-screen state that is an initial state. It should be understood that due to a special nature of the retractable display screen, the initial state may also be a state in which the display screen of the electronic device has been stretched to a certain extent.

In a specific embodiment, the present disclosure is not limited by an execution order of various steps described. Some steps may also be performed in other orders or performed simultaneously without conflicts.

As can be seen above, with the device control method according to the embodiments of the present disclosure, the second display content to be displayed in addition to the first display content currently displayed is determined. The retractable display screen is controlled, based on the second display content, to stretch, for adding the display region beyond the current display region used for displaying the first display content. The second display content is displayed in the added display region. The first display content continues to be displayed in the current display region. In the solution, by controlling the stretching of the retractable display screen, the second display content to be displayed in addition to the first display content currently displayed is displayed in the display region added subsequent to the stretching of the retractable display screen, thereby avoiding blocking of the currently displayed content of the current electronic device to improve the display effect of the electronic device.

The method described according to the above embodiments will be described in further detail below with the following examples.

Figure 8:
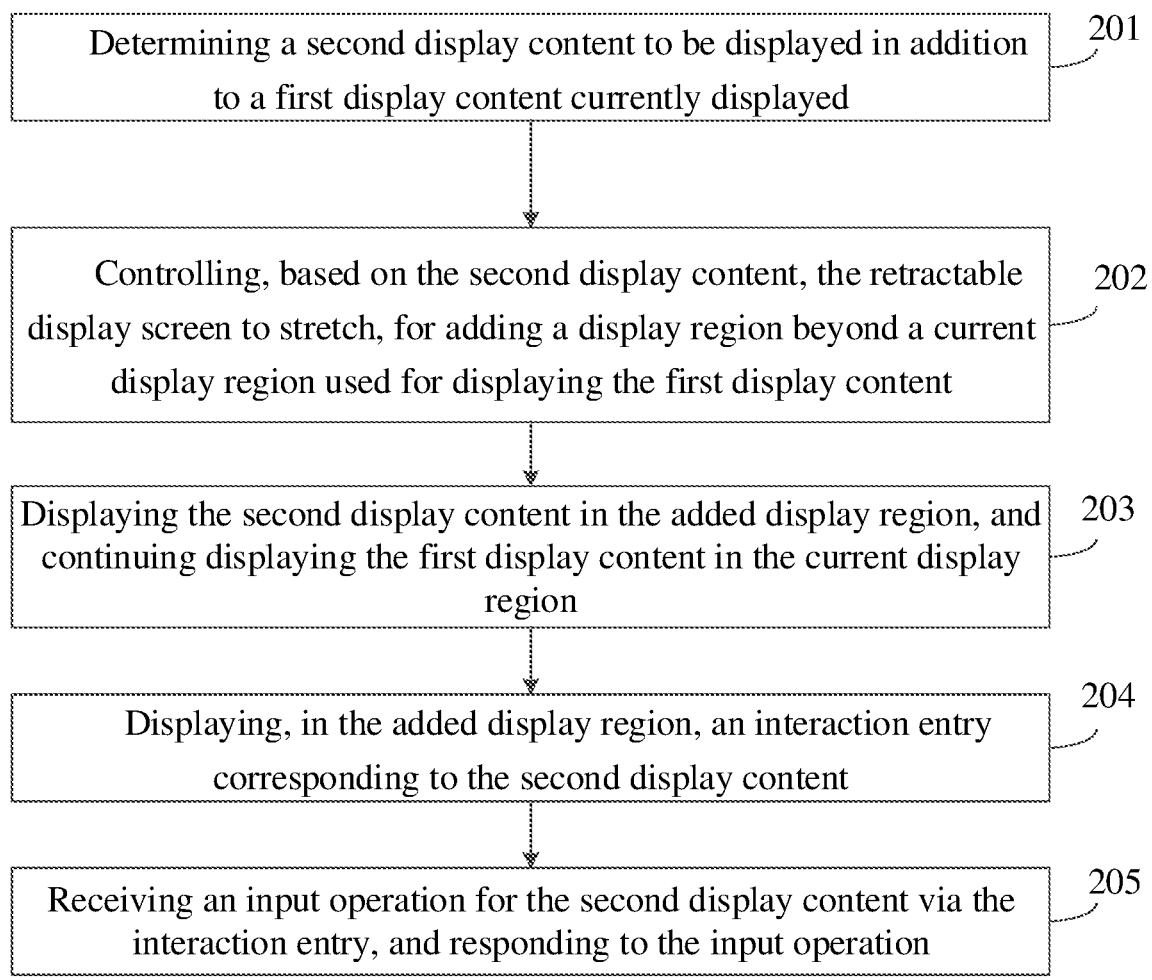
FIG. 8 is a second flowchart illustrating a device control method according to an embodiment of the present disclosure.

FIG. 8 is a second flowchart illustrating a device control method according to an embodiment of the present disclosure. The device control method may be applied in the electronic device that may include the retractable display screen. As illustrated in FIG. 8, a process of the device control method may include the following operations.

At 201, a second display content to be displayed in addition to a first display content currently displayed is determined.

The first display content currently displayed refers to a content displayed on a current page of the electronic device. The second display content refers to a content that the user wants to display on a screen of the electronic device, a message pushed by a system, etc. The content that the user wants to display on the screen of the electronic device may be, e.g., a bullet-screen comment of a video, a video comment, lyrics, a shortcut menu, and a keyboard. The message pushed by the system may be a message pushed by various applications, such as news pushed by a news application, a new message reminder pushed by a social application, and an application update reminder, etc.

In an embodiment, the operation of "determining a second display content to be displayed in addition to a first display content currently displayed" may include the following operations.

(1) A notification event in the electronic device is monitored.

The notification event may be an incoming call event, a new email reception event, a new message reception event, etc., or may be an event corresponding to an input operation of the user.

(2) The second display content to be displayed is determined based on the notification event.

For example, when the notification event is the incoming call event, the second display content to be displayed may be an incoming call notification. When the notification event is the new message reception event, the second display content to be displayed may be a new message reminder notification or a specific content of a new message. Or, when the notification message is news pushed by a news application, the second display content to be displayed may be a news headline or a specific content of a piece of news, etc.

In an embodiment, the device control method may further: provide a Software Development Kit (SDK) functional interface used for controlling stretching or retraction of the retractable display screen; and in response to receiving from a third-party application an invoking instruction for the SDK functional interface, determine, based on the invoking instruction, a second display content to be displayed by the third-party application. That is, to meet more flexible needs, an ability of an operating system to control the retractable display screen can be made public to allow the third-party application to invoke the ability. In some embodiments, a standard interface can be developed and encapsulated into an SDK function interface to establish a connection between the third-party application and the system, allowing the third-party application to actively adapt to the retractable display screen.

The system may be responsible for packaging and providing current state information of the electronic device to the third-party application, such as a stretching state or a retraction state of the retractable display screen, a screen size of the display region, and a maximum size and a minimum size that the retractable display screen can be stretched or retracted to. Meanwhile, the system can also monitor a request from the third-party application, such as calculating a range that the retractable display screen needs to be retracted or stretched, responding to stretching or retraction of the retractable display screen, etc.

It should be noted that in the embodiments of the present disclosure, the electronic device may have a retractable display screen. The retractable display screen may be a display screen that can be retracted or stretched (also known as a retractable display panel). The retractable display screen may be a flexible display screen that can be bent, curled, folded, etc. In an electronic device configured with the retractable display screen, the visible size of the screen can be increased by stretching the retractable display screen, and the visible size of the screen can be reduced by retracting the retractable display screen. For example, the flexible display screen 30 in each of FIG. 1 to FIG. 5 is the retractable display screen.

At 202, the retractable display screen is controlled, based on the second display content, to stretch, for adding a display region beyond a current display region used for displaying the first display content.

Due to the difference in its content, the second display content will have a different display style and a different required display region. Therefore, it is necessary to control stretching of the retractable display screen accordingly based on the display style and the display region that are required by the second display content.

For example, when the second display content is a new message reminder, a size of the display region corresponding to the second display content is A. When the user triggers an interaction entry in the second display content, e.g., a message viewing entry, the user performs an operation of viewing a message by clicking a control button corresponding to the interaction entry. In this case, a size of a display region corresponding to an interface for viewing the message is B. When A is smaller than B, the retractable display screen may continue to be stretched to increase the size of the display region for displaying the second display content to B, which is used to adapt to a page content. In practice, A may be equal to or greater than B. Different processing may be performed depending on specific situations.

In an embodiment, the method can include the following operations, prior to the operation of "controlling, based on the second display content, the retractable display screen to stretch".

(1) Feature information of the second display content is obtained.

The feature information refers to a content feature of the second display content, such as a text, an image, a video, etc.

(2) A display policy matching the feature information is obtained.

The display policy refers to information such as a display format, a display layout, and typesetting of the second display content.

The operation of "adding a display region beyond a current display region used for displaying the first display content" includes the following operations.

(3) A region size required to display the second display content is determined based on the display policy.

For example, if the second display content is a text and the display policy indicates information such as a font, a font size, and typesetting that are displayed by the text, a display region size required to display the second display content can be calculated based on the display policy.

For example, if the second display content is a picture and the display policy indicates width information and height information for display of the picture, the display region size required to display the second display content can be calculated based on the display policy.

(4) The retractable display screen is controlled to stretch, to add the display region of the region size.

That is, when the display region size required by the second display content is calculated, the display region of the display region size is added.

It should be understood that, when the second display content to be displayed occurs, the electronic device may obtain a size of a current display region of the retractable display screen, and determine a size of a display region that can be added subsequent to stretching of the retractable display screen. When the size of the display region that can be added meets the size of the display region required to display the second display content, the retractable display screen is controlled to stretch to add the display region of the corresponding size.

At 203, the second display content is displayed in the added display region, and the first display content continues to be displayed in the current display region.

For example, when the user is playing a game with a cell phone and receives an incoming call, the first display content displayed in the current display region is a game picture of the game that the user is currently playing, and the second display content is an incoming call notification. The retractable display screen of the current cell phone is then controlled to be stretched to add a display region beyond a display region of the game picture, thereby displaying the incoming call notification in the added display region and continuing to maintain display of the game picture.

For example, when the user is watching a movie on the cell phone and finds that there are too many bullet-screen comments on the top of the movie that cause a certain degree of blocking of a content of the movie and affect his/her observation of details in the movie, the user can then trigger a bullet-screen comment non-blocking mode, i.e., control the retractable display screen of the current cell phone to stretch, to add a display region beyond a display region of a movie picture. The bullet-screen comments are transferred to and displayed in the added display region, while display of the movie picture is maintained. Therefore, the user can view a complete movie picture, avoiding blocking of the movie picture by the bullet-screen comments. In this example, the first display content is the movie picture and the second display content is the bullet-screen comments.

In an embodiment, the operation of "displaying the second display content in the added display region" may include the following operations.

(1) The second display content is displayed in accordance with the display policy.

At 204, an interaction entry corresponding to the second display content is displayed in the added display region.

Figure 9:
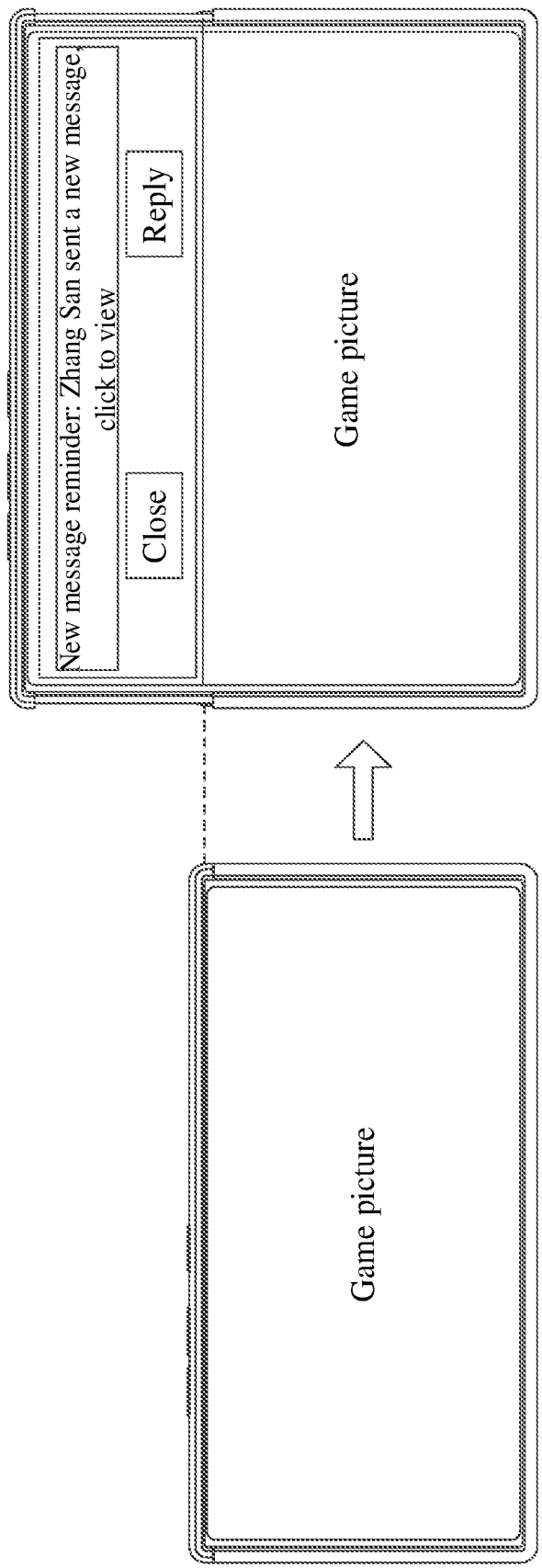
FIG. 9 to FIG. 12 are each a schematic diagram illustrating a scenario of a device control method according to an embodiment of the present disclosure.
Figure 10:
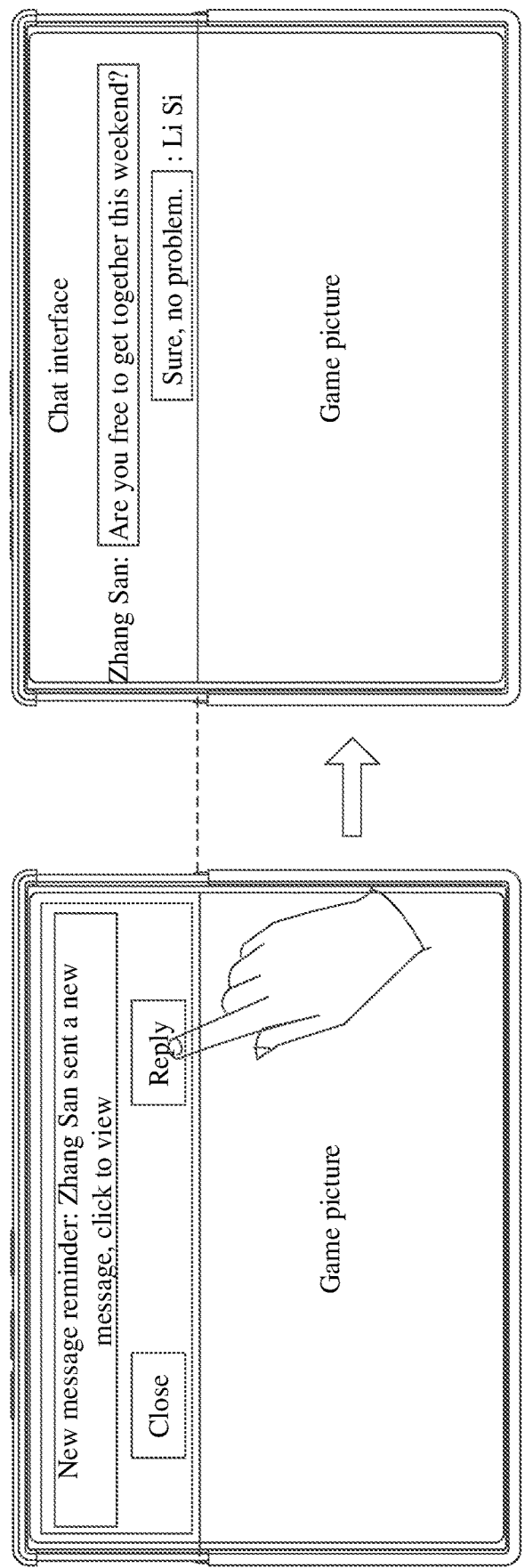

For example, as illustrated in FIG. 9, when the user is playing a game and suddenly the electronic device receives a new message reminder notification, the new message reminder notification is displayed as the second display content in the added display region, and a game picture of the game played by the user continues to be displayed in an original display region. In addition, a message reply entry may further be provided on a page of the new message reminder notification. As illustrated in FIG. 10, the user may click on the message reply entry to reply to the message in the added display region. In this case, the added display region can be used as a "split-screen window" through which the user can perform multitasking.

For example, if the second display content is bullet-screen comments of a video, the interaction entry may be a function such as a bullet-screen comment reply and bullet-screen comment settings.

For example, if the second display content is the shortcut menu, the interaction entry corresponds to a control button in the shortcut menu.

In an embodiment, the method can further include the following operations, subsequent to the operation of "displaying, in the added display region, an interaction entry corresponding to the second display content".

(1) In response to detecting no input operation for the interaction entry within a predetermined time length, display of the second display content is ended, and the retractable display screen is restored to a state prior to the stretching.

For example, the predetermined time length may be set to three seconds. When the second display content in the electronic device is displayed for more than three seconds, i.e., the user perform no feedback operation on the second display content, it may be determined that the user has viewed the second display content completely or the user does not need to view the second display content. In this case, the second display content is put away. Also, the retractable display screen of the electronic device is controlled to retract to restore the retractable display screen to a state prior to the display of the second display content. The first display content continues to be displayed in the current display region.

For example, as illustrated in FIG. 10, the user may also click on an interaction entry "Close" to end the display of the second display content.

At 205, an input operation for the second display content is received via the interaction entry, and the input operation is responded to.

The input operation may include a touch operation, a swipe operation, and other operations. For example, the touch operation may be an operation such as clicking, a long-press operation; and the swipe operation may be a left-right swipe operation, a single-finger gesture operation, a multi-finger gesture operation, or the like.

For example, if the second display content is the new message notification and the interaction entry is the message reply entry, the user enters a chat interface of an application corresponding to the new message notification in response to a click on the message reply entry, and can activate, via a message reply box in the chat interface, a keyboard to perform a text reply. For example, the user is Zhang San and his friend Li Si is in contact with Zhang San, as illustrated in FIG. 10. FIG. 10 illustrates a chat interface between Zhang San and Li Si: Zhang San: "Are you free to get together this weekend", Li Si: "Sure, no problem". In addition, Zhang San may also conduct voice chat, video chat, or the like with Li Si via a corresponding interaction entry in the chat interface.

In an embodiment, in response to responding to the input operation, the second display content displayed in the added region will change accordingly with the input operation. In this case, the retractable display screen of the electronic device can continue to be controlled to stretch or contract based on a change of the second display content.

In an embodiment, the method can further include the following operations, subsequent to the operation of "responding to the input operation".

(1) The retractable display screen is restored to a state prior to the stretching.

Figure 11:
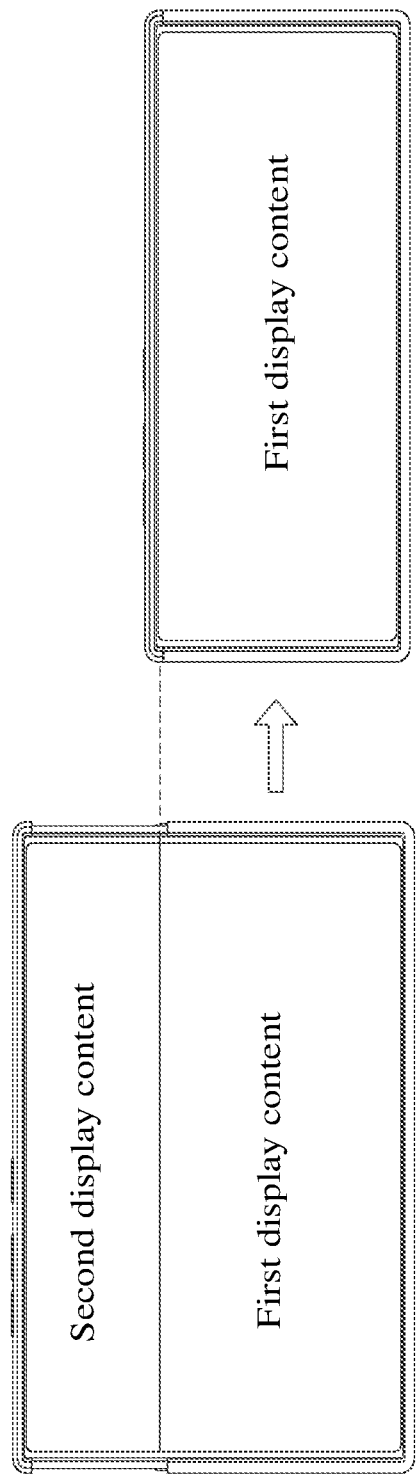

For example, the input operation performed by the user on a relevant entry in the second display content is detected. If no corresponding input operation is detected for a long period of time, it is determined that the user does not need to perform a corresponding interaction operation on the second display content. In this case, the second display content is put away. Also, the retractable display screen of the electronic device is controlled to retract to restore the retractable display screen to the state prior to the display of the second display content. The first display content continues to be displayed in the current display region. FIG. 11 illustrates a process of retracting the retractable display screen of the electronic device to put away the second display content and restore the retractable display screen. FIG. 11 corresponds to a reverse process of stretching the retractable display screen of the electronic device in FIG. 7.

Figure 12:
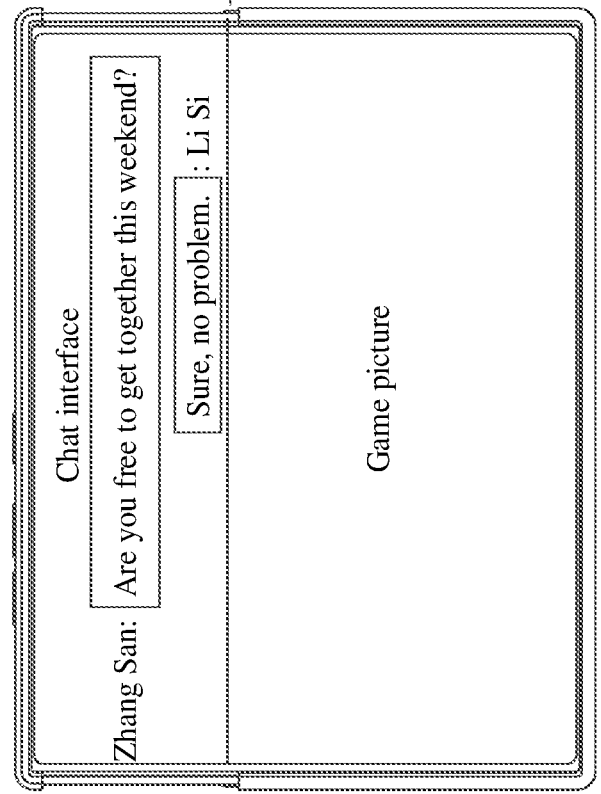

For example, FIG. 12 illustrates a process of restoring, in response to the input operation for the second display content, the retractable display screen to the state prior to the stretching.

That is, the present solution can perform a series of operations such as stretching the screen, displaying the second display content, responding to an event corresponding to the interaction entry on the second display content, and retracting the screen.

As can be seen above, with the device control method provided by the present disclosure, the second display content to be displayed in addition to the first display content currently displayed is determined. The retractable display screen is controlled, based on the second display content, to stretch, for adding the display region beyond the current display region used for displaying the first display content. The second display content is displayed in the added display region. The first display content continues to be displayed in the current display region. In the solution, by controlling the stretching of the retractable display screen, the second display content to be displayed in addition to the first display content currently displayed is displayed in the display region added subsequent to the stretching of the retractable display screen, thereby avoiding the blocking of the currently displayed content of the current electronic device to improve the display effect of the electronic device.

Figure 13:
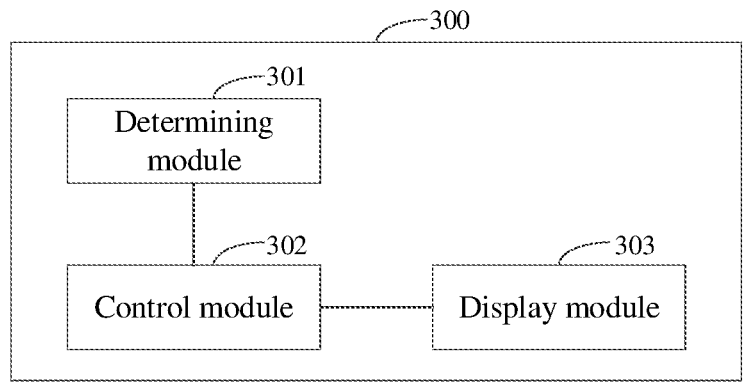
FIG. 13 is a schematic structural diagram of a device control apparatus according to an embodiment of the present disclosure.

In an embodiment, a device control apparatus is further provided. FIG. 13 is a schematic structural diagram of a device control apparatus 300 according to an embodiment of the present disclosure. The device control apparatus 300 is applied in an electronic device. As illustrated in FIG. 13, the device control apparatus 300 may include a determining module 301, a control module 302, and a display module 303.

The determining module 301 is configured to determine a second display content to be displayed in addition to a first display content currently displayed.

The control module 302 is configured to control, based on the second display content, the retractable display screen to stretch, for adding a display region beyond a current display region used for displaying the first display content.

The display module 303 is configured to display the second display content in the added display region, and continue displaying the first display content in the current display region.

In an embodiment, the determining module 301 can be further configured to: monitor a notification event in the electronic device; and determine, based on the notification event, the second display content to be displayed.

In an embodiment, the control module 302 can be further configured to, prior to the controlling, based on the second display content, the retractable display screen to stretch: obtain feature information of the second display content; and obtain a display policy matching the feature information.

In an embodiment, the control module 302 can be further configured to: determine, based on the display policy, a region size required to display the second display content; and control the retractable display screen to stretch, to add the display region of the region size.

In an embodiment, the control module 302 can be further configured to: in response to detecting no input operation for the interaction entry within a predetermined time length, end display of the second display content, and restore the retractable display screen to a state prior to the stretching.

In an embodiment, the display module 303 can be further configured to display the second display content in accordance with the display policy.

In an embodiment, the display module 303 can be further configured to: display, in the added display region, an interaction entry corresponding to the second display content; and receive an input operation for the second display content via the interaction entry, and respond to the input operation.

In an embodiment, the control module 302 can be further configured to, subsequent to the responding to the input operation: restore the retractable display screen to a state prior to the stretching.

It should be noted that, the device control apparatus provided by the embodiments of the present disclosure is of the same concept as the device control method according to any of the above embodiments. The device control apparatus can implement the method according to any of the device control method embodiments, a specific implementation of which can refer to the device control method embodiments and will be omitted herein.

As can be seen above, with the device control apparatus provided by the present disclosure, the determining module 301 is configured to determine the second display content to be displayed in addition to the first display content currently displayed. The control module 302 is configured to control, based on the second display content, the retractable display screen to stretch, for adding the display region beyond the current display region used for displaying the first display content. The display module 303 is configured to display the second display content in the added display region, and continue displaying the first display content in the current display region. In the solution, by controlling the stretching of the retractable display screen, the second display content to be displayed in addition to the first display content currently displayed is displayed in the display region added subsequent to the stretching of the retractable display screen, thereby avoiding the blocking of the currently displayed content of the current electronic device to improve the display effect of the electronic device.

The embodiments of the present disclosure provide a computer-readable storage medium. The computer-readable storage medium stores a computer program. The computer program, when executed on a computer, causes the computer to perform the process in the device control method according to any of the embodiments.

The embodiments of the present disclosure further provide an electronic device including a memory and a processor. The processor is configured to perform, by invoking a computer program stored in the memory, the process in the device control method according to any of the embodiments.

Figure 14:
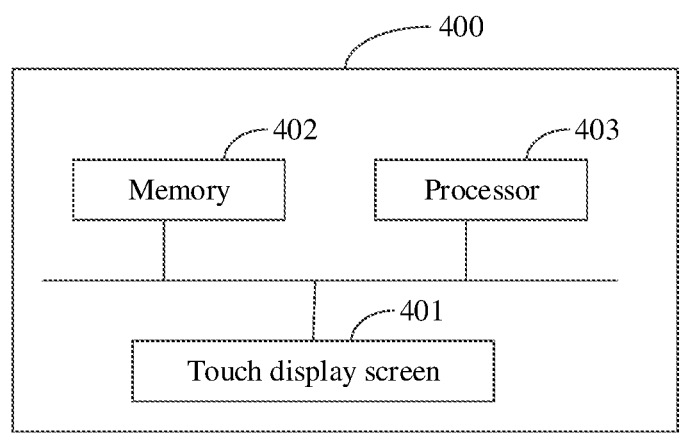
FIG. 14 is a schematic structural diagram of an electronic device according to an embodiment of the present disclosure.

For example, the above-mentioned electronic device may be a mobile terminal such as a tablet computer or a smartphone. FIG. 14 is a schematic structural diagram of an electronic device according to an embodiment of the present disclosure.

As illustrated in FIG. 14, an electronic device 400 can include components such as a touch display screen 401, a memory 402, a processor 403, etc. Those skilled in the art can understand that the structure of the electronic device illustrated in FIG. 14 does not constitute a limitation of the electronic device. The electronic device 400 may include more or fewer components than those illustrated in the figure, or combine certain components, or have a different arrangement of components.

The touch display screen 401 may be a retractable touch display screen. The retractable touch display screen may be a touch display screen that can be retracted or stretched. The retractable touch display screen may be a flexible display screen that can be bent, curled, folded, etc. In an electronic device configured with the retractable touch display screen, a visible size of the screen can be increased by stretching the retractable touch display screen, and the visible size of the screen can be reduced by retracting the retractable touch display screen.

The memory 402 can be configured to store an application and data. The application stored in the memory 402 contains executable codes. The application may form various functional modules. The processor 403 performs various functional applications and data processing through executing the application stored in the memory 402.

The processor 403, as a control center of the electronic device, connects individual parts of the entire electronic device using various entries and lines, and performs various functions of the electronic device and processes data by running or executing the application stored in the memory 402 and by calling the data stored in the memory 402, thereby monitoring the electronic device as a whole.

In the embodiments, the processor 403 in the electronic device loads executable codes corresponding to processes of one or more applications into the memory 402 in accordance with the following instructions, and executes the application stored in the memory 402 to: determine a second display content to be displayed in addition to a first display content currently displayed; control, based on the second display content, the retractable display screen to stretch, for adding a display region beyond a current display region used for displaying the first display content; and display the second display content in the added display region, and continue displaying the first display content in the current display region.

Figure 15:
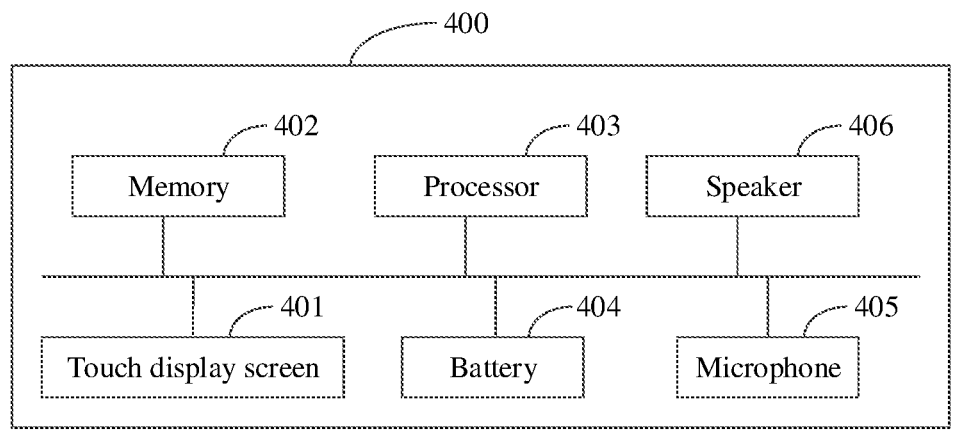
FIG. 15 is another schematic structural diagram of an electronic device according to an embodiment of the present disclosure.

As illustrated in FIG. 15, the electronic device 400 can include a touch display screen 401, a memory 402, a processor 403, a battery 404, a microphone 405, a speaker 406, and other components.

The touch display screen 401 may be a curlable touch display screen. The curlable touch display screen may be a touch display screen that can be retracted or stretched. The curlable touch display screen may be a flexible display screen that can be bent, curled, folded, etc. In an electronic device configured with the curlable touch display screen, a visible size of the screen can be increased by stretching the curlable touch display screen, and the visible size of the screen can be reduced by curling back the curlable touch display screen.

The memory 402 can be configured to store an application and data. The application stored in the memory 402 contains executable codes. The application may form various functional modules. The processor 403 performs various functional applications and data processing by executing the application stored in the memory 402.

The processor 403, as a control center of the electronic device, connects individual parts of the entire electronic device using various entries and lines, and performs various functions of the electronic device and processes data by running or executing the application stored in the memory 402 and by calling the data stored in the memory 402, thereby monitoring the electronic device as a whole.

The battery 404 can be configured to supply power to various modules and components of the electronic device.

The microphone 405 can be configured to receive sound signals from an ambient environment, e.g., a voice instruction from the user.

The speaker 406 can be configured play sound signals.

In the embodiments, the processor 403 in the electronic device loads executable codes corresponding to processes of one or more applications into the memory 402 in accordance with the following instructions, and executes the application stored in the memory 402 to perform: determining a second display content to be displayed in addition to a first display content currently displayed; controlling, based on the second display content, the retractable display screen to stretch, for adding a display region beyond a current display region used for displaying the first display content; and displaying the second display content in the added display region, and continuing displaying the first display content in the current display region.

In an embodiment, the processor 403 can perform, when performing the determining the second display content to be displayed in addition to the first display content currently displayed: monitoring a notification event in the electronic device; and determining, based on the notification event, the second display content to be displayed.

In an embodiment, the processor 403 can perform, prior to performing the controlling, based on the second display content, the retractable display screen to stretch: obtaining feature information of the second display content; and obtaining a display policy matching the feature information.

In an embodiment, the processor 403 can perform, when performing the adding the display region beyond the current display region used for displaying the first display content: determining, based on the display policy, a region size required to display the second display content; and controlling the retractable display screen to stretch, to add the display region of the region size.

In an embodiment, the processor 403 can perform, when performing the displaying the second display content in the added display region: displaying the second display content in accordance with the display policy.

In an embodiment, the processor 403 can perform, subsequent to the displaying the second display content in the added display region, and the continuing displaying the first display content in the current display region: displaying, in the added display region, an interaction entry corresponding to the second display content; and receiving an input operation for the second display content via the interaction entry, and responding to the input operation.

In an embodiment, the processor 403 can further perform, subsequent to the responding to the input operation: restoring the retractable display screen to a state prior to the stretching.

In an embodiment, the processor 403 can further perform, subsequent to the displaying, in the added display region, the interaction entry corresponding to the second display content: in response to detecting no input operation for the interaction entry within a predetermined time length, ending display of the second display content, and restoring the retractable display screen to a state prior to the stretching.

In above embodiments, different aspects are emphasized in description of respective embodiments. Those not detailed in some embodiments can refer to the above detailed description of the device control method, which is not described in detail herein.

The device control apparatus provided by the embodiments of the present disclosure is of the same concept as the device control method according to any of the above embodiments. The method according to any of the device control method embodiments can be executed on the device control apparatus, a specific implementation of which can refer to the device control method embodiments and will be omitted herein.

It should be noted that, for the device control method according to the embodiments of the present disclosure, those skilled in the art can understand that all or part of the processes for implementing the device control method according to the embodiments of the present disclosure can be completed by controlling relevant hardware through a computer program. The computer program may be stored in a computer-readable storage medium such as in a memory and executed by at least one processor. The computer program, when executed, may include the process of any of the embodiments of the device control method. The storage medium may be a disk, an optical disk, a Read Only Memory (ROM), a Random Access Memory (RAM), etc.

Functional modules of the device control apparatus according to the embodiments of the present disclosure may be integrated into one processing unit or they may physically exist separately, or two or more modules may be integrated into one module. The integrated module may be implemented in the form of hardware, or in the form of a software functional module. When the integrated module is implemented in the form of the software functional module and is sold or used as a standalone product, it can be stored in a computer-readable storage medium. The computer-readable storage medium may be, e.g., an ROM, a magnetic disk, or an optical disc.

The device control method and apparatus, the storage medium, and the electronic device according to the embodiments of the present disclosure are described in detail above. Specific embodiments are used in the present disclosure to illustrate the principles and implementations of the present disclosure. The description of the above embodiments is only intended to facilitate understanding of the method and its core concepts. Meanwhile, those skilled in the art can make modifications to specific implementations and change an application scope based on the concepts of the present disclosure. In summary, the contents of the specification shall not be construed as limitations of the present disclosure.

What is claimed is:

1. A device control method, applied in an electronic device comprising a retractable display screen, the device control method comprising:
   determining a second display content to be displayed in addition to a first display content that is currently displayed;
   controlling, based on the second display content, the retractable display screen to stretch, for adding a display region beyond a current display region in which the first display content is displayed; and
   displaying the second display content in the added display region, and continuing displaying the first display content in the current display region,
   wherein the device control method further comprises:
   providing a Software Development Kit (SDK) functional interface used for controlling stretching or retraction of the retractable display screen,
   wherein said determining the second display content to be displayed in addition to the first display content that is currently displayed comprises:
   in response to receiving from a third-party application an invoking instruction for the SDK functional interface, determining, based on the invoking instruction, the second display content to be displayed by the third-party application.

2. The device control method according to claim 1, further comprising:
   displaying, in the added display region, an interaction entry corresponding to the second display content; and
   receiving, via the interaction entry, an input operation for the second display content, and responding to the input operation.

3. The device control method according to claim 2, further comprising, subsequent to said displaying, in the added display region, the interaction entry corresponding to the second display content:
   in response to detecting no input operation for the interaction entry within a predetermined time length, ending display of the second display content, and restoring the retractable display screen to a state prior to the stretching.

4. The device control method according to claim 2, further comprising, subsequent to said responding to the input operation:
   restoring the retractable display screen to a state prior to the stretching.

5. The device control method according to claim 1, further comprising, prior to said controlling, based on the second display content, the retractable display screen to stretch:
   obtaining feature information of the second display content; and
   obtaining a display policy matching the feature information.

6. The device control method according to claim 5, wherein said adding the display region beyond the current display region in which the first display content is displayed comprises:
   determining, based on the display policy, a region size required to display the second display content; and
   controlling the retractable display screen to stretch, to add the display region of the region size.

7. The device control method according to claim 5, wherein said displaying the second display content in the added display region comprises:
   displaying the second display content in accordance with the display policy.

8. The device control method according to claim 1, wherein said determining the second display content to be displayed in addition to the first display content that is currently displayed comprises:
   monitoring a notification event in the electronic device; and
   determining, based on the notification event, the second display content to be displayed.

9. A non-transitory computer-readable storage medium, having a computer program stored thereon, wherein the computer program, when executed on a computer, causes the computer to perform a device control method applied in an electronic device comprising a retractable display screen, the device control method comprising:
   determining a second display content to be displayed in addition to a first display content that is currently displayed;
   controlling, based on the second display content, the retractable display screen to stretch, for adding a display region beyond a current display region in which the first display content is displayed; and
   displaying the second display content in the added display region, and continuing displaying the first display content in the current display region,
   wherein the device control method further comprises:
   providing a Software Development Kit (SDK) functional interface used for controlling stretching or retraction of the retractable display screen,
   wherein said determining the second display content to be displayed in addition to the first display content that is currently displayed comprises:
   in response to receiving from a third-party application an invoking instruction for the SDK functional interface, determining, based on the invoking instruction, the second display content to be displayed by the third-party application.

10. The non-transitory computer-readable storage medium according to claim 9, wherein the method further comprises:
    displaying, in the added display region, an interaction entry corresponding to the second display content; and
    receiving, via the interaction entry, an input operation for the second display content, and responding to the input operation.

11. An electronic device, comprising a processor and a memory, wherein the memory has a computer program stored thereon; and the processor is configured to invoke the computer program to:
    determine a second display content to be displayed in addition to a first display content that is currently displayed;
    control, based on the second display content, the retractable display screen to stretch, for adding a display region beyond a current display region used for displaying the first display content; and
    display the second display content in the added display region, and continuing displaying the first display content in the current display region,
    wherein the processor is further configured to:
    provide an SDK functional interface used for controlling stretching or retraction of the retractable display screen; and
    wherein said determining the second display content to be displayed in addition to the first display content currently displayed comprises:
    in response to receiving from a third-party application an invoking instruction for the SDK functional interface, determine, based on the invoking instruction, the second display content to be displayed by the third-party application.

12. The electronic device according to claim 11, wherein the processor is further configured to:
   display, in the added display region, an interaction entry corresponding to the second display content; and
   receive, via the interaction entry, an input operation for the second display content, and responding to the input operation.

13. The electronic device according to claim 12, wherein the processor is further configured to:
   in response to detecting no input operation for the interaction entry within a predetermined time length, end display of the second display content, and restore the retractable display screen to a state prior to the stretching.

14. The electronic device according to claim 12, wherein the processor is further configured to:
   restore the retractable display screen to a state prior to the stretching.

15. The electronic device according to claim 11, wherein the processor is further configured to:
   obtain feature information of the second display content; and
   obtain a display policy matching the feature information.

16. The electronic device according to claim 15, wherein the processor is further configured to:
   determine, based on the display policy, a region size required to display the second display content; and
   control the retractable display screen to stretch, to add the display region of the region size.

17. The electronic device according to claim 15, wherein the processor is further configured to:
   display the second display content in accordance with the display policy.

18. The electronic device according to claim 11, wherein the processor is further configured to:
   monitor a notification event in the electronic device; and
   determine, based on the notification event, the second display content to be displayed.

19. The device control method according to claim 1, further comprising packaging and providing current state information of the electronic device to the third-party application to allow the third-party application to actively adapt to the retractable display screen,
   wherein the current state information of the electronic device comprises a stretching state or a retraction state of the retractable display screen, a screen size of the display region, or a maximum size and a minimum size that the retractable display screen is stretchable or retractable.

20. The electronic device according to claim 11, wherein the processor is further configured to: package and provide current state information of the electronic device to the third-party application to allow the third-party application to actively adapt to the retractable display screen,
   wherein the current state information of the electronic device comprises a stretching state or a retraction state of the retractable display screen, a screen size of the display region, or a maximum size and a minimum size that the retractable display screen is stretchable or retractable.

* * * * *